United States Patent
Damm et al.

[11] Patent Number: 6,051,792
[45] Date of Patent: Apr. 18, 2000

[54] RETENTION STRIP

[75] Inventors: Jesper Damm, Herlev, Denmark; Etienne Laeremans, Scherpenheuvel-Zichen, Belgium

[73] Assignee: N.V. Raychem S.A., Kessel-Lo, Belgium

[21] Appl. No.: 08/809,331

[22] PCT Filed: Sep. 19, 1995

[86] PCT No.: PCT/GB95/02229

§ 371 Date: Jul. 22, 1997

§ 102(e) Date: Jul. 22, 1997

[87] PCT Pub. No.: WO96/09672

PCT Pub. Date: Mar. 28, 1996

[30] Foreign Application Priority Data

Sep. 21, 1994 [GB] United Kingdom ................... 9419033

[51] Int. Cl.[7] .................................................. H01R 4/00
[52] U.S. Cl. ................................................. 174/93; 174/92
[58] Field of Search ............................... 174/93, 92, 77 R

[56] References Cited

U.S. PATENT DOCUMENTS

| | | | |
|---|---|---|---|
| 3,064,072 | 11/1962 | Graff et al. | 174/84 R X |
| 3,775,204 | 11/1973 | Thompson et al. | 174/92 X |
| 3,808,353 | 4/1974 | Burtelson | 174/92 |
| 4,107,451 | 8/1978 | Smith, Jr. et al. | 174/84 R |
| 4,632,488 | 12/1986 | Long et al. | 439/452 |
| 4,692,565 | 9/1987 | Koht et al. | 174/77 R X |
| 4,733,629 | 3/1988 | Hunt et al. | 138/129 X |
| 4,942,270 | 7/1990 | Gamarra | 174/77 R X |
| 4,963,698 | 10/1990 | Chang et al. | 174/77 R |
| 5,113,038 | 5/1992 | Dehling | 174/77 R X |
| 5,288,947 | 2/1994 | Stewing | 174/92 |
| 5,313,019 | 5/1994 | Brusselmans et al. | 174/77 R X |

FOREIGN PATENT DOCUMENTS

| | | | |
|---|---|---|---|
| 0 316 911 A2 | 5/1989 | European Pat. Off. | H02G 15/18 |
| 0 421 254 A2 | 4/1991 | European Pat. Off. | H02G 15/18 |
| 0 538 008 A2 | 4/1993 | European Pat. Off. | |
| 0 538 008 A3 | 4/1993 | European Pat. Off. | H02G 15/013 |
| 2 427 668 | 12/1979 | France | H01B 17/58 |
| 0 206 854 | 5/1986 | France . | |
| 20 12 631 | 9/1971 | Germany | H02G 15/18 |
| 27 43 937 | 4/1979 | Germany | H02G 15/013 |
| 41 35 570 C1 | 11/1992 | Germany | H02G 15/013 |
| 93029 | 11/1977 | Poland | B29F 1/06 |
| 158424 | 9/1992 | Poland | H02G 15/02 |
| 174938 | 10/1998 | Poland | H02G 15/007 |
| WO 81/01487 | 5/1981 | WIPO | H02G 15/10 |
| WO 92/05609 | 4/1992 | WIPO . | |
| WO 93/26070 | 12/1993 | WIPO | H02G 15/013 |
| WO 95/15600 | 6/1995 | WIPO | H02G 15/013 |

*Primary Examiner*—Kristine Kincaid
*Assistant Examiner*—William H. Mayo, III
*Attorney, Agent, or Firm*—Herbert G. Burkard; Myers Bigel Sibley & Sajovec

[57] ABSTRACT

A retention strip for winding around an elongate object is disclosed. When the strip is wound in use it can decrease in length when compressed around the object, thereby contracting around the object. The strip preferably includes one or more, preferably a plurality of, collapsible portions, and the strip can decrease in length due to the collapsing of one or more of the collapsible portions.

20 Claims, 7 Drawing Sheets

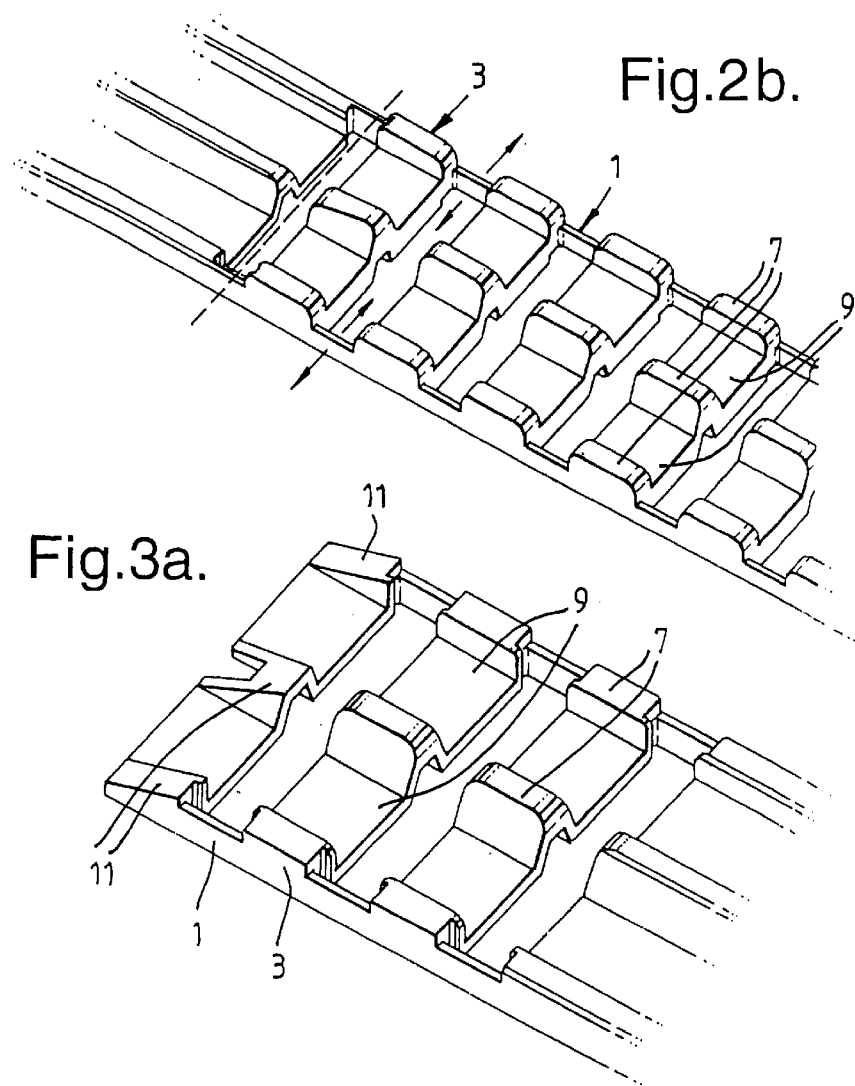
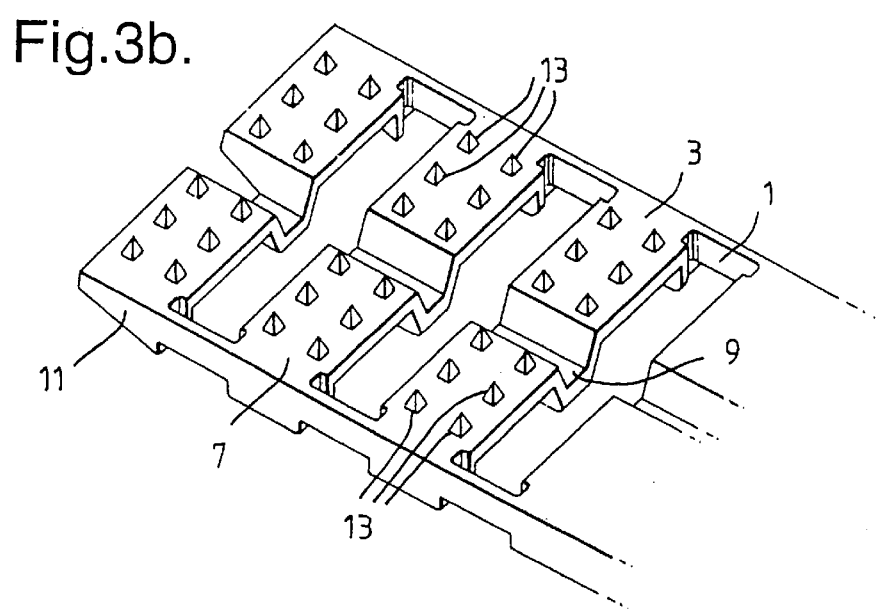

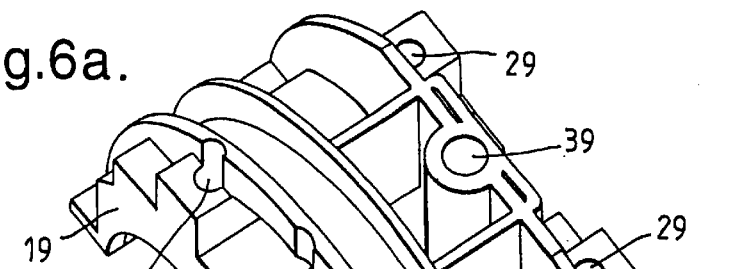
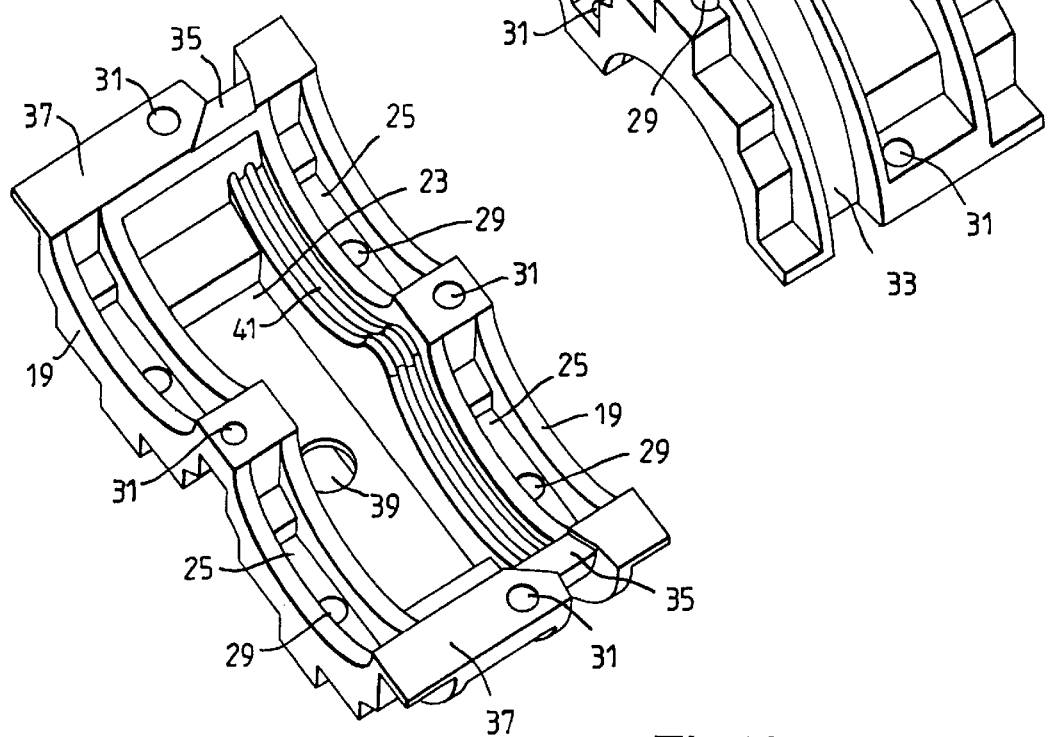
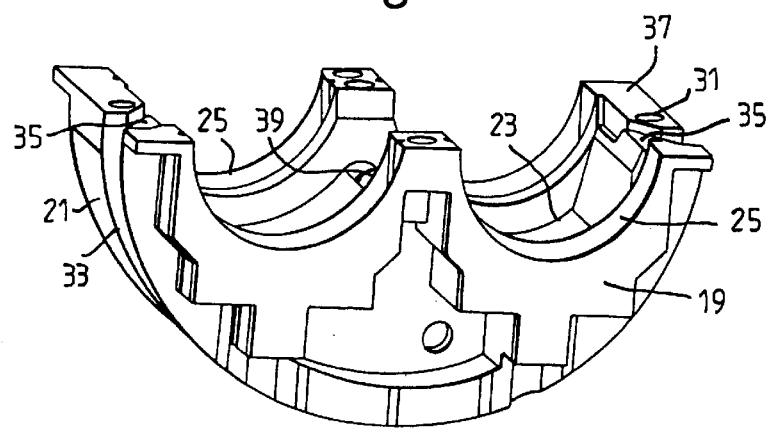

RETENTION STRIP

BACKGROUND OF THE INVENTION

Field of the Invention

The present invention relates to a retention strip for winding around an elongate object, for example a pipe, but especially a cable.

In the art of cable splice closures, it is known to wrap tape around a cable in order to build up its diameter to that of a cable entry port of a splice closure, in order to seal the closure. For example, U.S. Pat. No. 4,933,512 discloses a cable junction closure comprising a sleeve, a pair of rigid end plates for closing the spaces between the cables and the sleeve, an elastic tape wound around the cables for sealing any gaps between the cables and the rigid end plates, and an elastic tape wound around each rigid end plate for sealing any gaps between the end plates and the sleeve.

U.S. Pat. No. 5,124,507 comprises a sleeve, sealing members with cable passage openings for insertion in the ends of the sleeve, and semi-circular sealing elements in the form of individually removable bearing shells lining the cable passage openings of the sealing members, for adapting the openings to different cable diameters. In order to eliminate any air gaps between the cable and the surrounding bearing shells, a sealing tape or band is wound onto each cable.

German Patent No. 4135570 discloses a sealing strip for winding around a cable leading through a cable passage opening, to form a seal which fits between the cable and the cable passage opening. The inside of the strip facing the cable has a roughened surface to increase the friction between the strip and the cable. The roughened surface is formed by projecting friction elements, which may be made from fine-grained carborundum or emery embedded in an adhesive layer, or from metal or plastic teeth anchored in the material of the strip.

INTRODUCTION TO THE INVENTION

We have now invented a new retention strip which can be wound around a cable or other elongate object to retain the elongate object in place with respect to another article (e.g. a cable splice closure) and/or to retain sealing material in place around the elongate object on one side of the strip.

According to a first aspect of the present invention, there is provided a retention strip for winding around an elongate object, which when so wound in use can decrease in length when compressed around the object, thereby allowing contraction of the strip around the object. Preferably, when the retention strip is contracted around an elongate object, it can grip the object.

The invention has particular utility in applications in which an elongate object (e.g. an electrical or telecommunications cable, or a pipe) extends through an aperture in an article, and the elongate object needs to be secured to the article and/or any gaps between the article and the elongate object need to be closed. More especially, the invention has utility as part of a cable splice closure. For example, the retention strip may be wound around a cable (or more than one cable) in order to increase the effective diameter of the cable to be substantially the same as, or at least closer to, the diameter of a cable entry aperture of a cable splice closure; compressing means (which may, for example, be part of the closure) may then compress the retention strip around the cable, and because the strip can decrease in length, it may contract around the cable. This contraction around the cable, of the wound retention strip, may have one or both of two important advantages, as follows.

Firstly, it may enable the compression force of the compressing means to be transmitted effectively to a cable around most, or preferably all, of the circumference of the cable, thereby causing the cable to be gripped firmly by the compressing means (via the retention strip) and therefore, for example, secured to a cable splice closure against external forces acting on the cable.

Secondly, the fact that the retention strip of the invention may contract around a cable may mean that it can provide enhanced sealing around the cable, for example to seal a cable splice closure from the environment. The contraction itself, may, in some circumstances, result in better sealing compared to that provided by known strips or tapes which do not contract in the manner of the invention. Even more advantageously however, use of the retention strip of the invention normally provides better sealing than would be possible with known strips or tapes if they were to be used in conjunction with compressing means as described above. This may be because, for example, known strips or tapes may buckle under compression due to their inability to contract, thereby forming gaps between the buckled parts. The retention strip of the invention may normally contract by the correct amount at each part of the circumference of the cable, thereby substantially preventing the formation of gaps between the strip and the compressing means which would normally form if a known (non-contracting) type of strip were used. The retention strip of the invention may, for example, of itself form a satisfactory environmental seal for a cable splice closure. Additionally or alternatively, the retention strip may, for example, provide sufficient retention of sealing material in a cable splice closure to enable the closure to be sealed from the environment by the sealing material. Preferably, therefore, when the retention strip according to the invention is contracted around an elongate object, it can substantially prevent passage of sealing material therethrough along the object, thereby retaining the sealing material on one side thereof.

Known tapes and strips do not have the above advantages because they do not decrease in length when compressed around a cable or the like, and hence they cannot normally contract around the cable in the manner of the strip according to the invention. The retention strip of the invention has the advantage that it can be radially contracted when wound around an object, the requisite circumferential contraction being accommodated, at least in part, by a reduction in the length of the strip.

The strip according to the invention is referred to herein as a retention strip because it generally has utility in retaining an elongate object in place with respect to another article (e.g. a cable splice closure) and/or in retaining sealing material in place.

According to preferred embodiments of the invention, the retention strip comprises one or more, preferably a plurality, of collapsible portions, and the strip can decrease in length due to the collapsing of one or more of the collapsible portions. The collapsible portion(s) may collapse by means of any of a variety of mechanisms, for example by telescoping (in a manner similar to a collapsible telescope). Preferably, however, the or each collapsible portion can collapse by deforming, e.g. by being crushed or concertinaed or by buckling. Preferably such deformation occurs in a direction generally or substantially parallel to the (axial) direction of extension of the elongate object around which the strip is wound, in use, and can be directed inwardly and/or outwardly, preferably outwardly, with respect to the remainder of the strip. This generally has the advantage of not giving rise to the formation of gaps (or at least significant gaps) between the windings of the strip through which sealing material might otherwise be able to escape. The or each collapsible portion preferably comprises a relatively weak portion of the retention strip. More preferably, the or each collapsible portion comprises one or more webs extending between substantially non-collapsible portions, e.g. one or more relatively thin portions which can deform, e.g. by buckling or concertinaing.

Preferably, the retention strip comprises a plurality of alternately collapsible and non-collapsible portions along at least part, preferably all, of the length thereof. This has the advantage of normally providing substantially uniform collapsibility along the length of the strip, such that the strip may contract relatively or substantially uniformly around an elongate object.

The or each collapsible portion (where present) of the retention strip may advantageously provide the flexibility to enable the retention strip to be wound around an elongate object. The or each substantially non-collapsible portion may, for example, be relatively or substantially inflexible: this stiffness can have the advantage of enabling the substantially non-collapsible portions of the strip to grip an elongate object relatively firmly. Advantageously, therefore, the retention strip may comprise a plurality of alternately substantially inflexible and flexible portions along at least part of its length.

According to particularly preferred embodiments of the invention, the retention strip is profiled such that, when spirally wound around an elongate object in use, successive windings interlock with each other, thereby substantially preventing helical displacement of the windings with respect to each other along the object. This may provide at least two important advantages. Firstly, it generally provides the retention strip with strength to resist axial forces acting on an elongate object (e.g. a cable) when it is wound around the object, i.e. it can substantially prevent the strip from telescoping out along the elongate object under the action of such axial forces, and therefore the grip of the strip on the elongate object can normally be retained. Secondly, it generally prevents accidental displacement of the windings of the strip with respect to each other (e.g. due to axial forces on the elongate object or for some other reason), which might otherwise compromise the ability of the strip to retain sealing material. The retention strip may, for example, have a plurality of protrusions and recesses which can engage with each other when the strip is wound in use. More preferably, the or each substantially non-collapsible portion (where present) of the retention strip has one or more projections on one surface thereof and one or m ore cooperating recesses on the opposite surface thereof, such that, for example, when the strip is wound around an object the projection(s) of one non-collapsible portion fit together with the recess(es) of another non-collapsible portion which it overlaps, or by which it is overlapped.

Preferably, the retention strip has a plurality of protrusions on a surface thereof, to enhance the grip of the retention strip on an elongate object around which it is wound in use. These protrusions may advantageously comprise protrusions which fit into cooperating recesses as described above. Preferably these protrusions are located only on the or each substantially non-collapsible portion (where present). The protrusions may, for example, penetrate part of an elongate object (e.g. the outer jacket of a cable) or they may merely pre ss against the object.

It was mentioned above that the retention strip of the invention has particular utility as part of a cable splice closure. According to a second aspect of the invention, therefore, there is provided a cable splice closure, comprising:

(a) a housing;
(b) at least one retention strip according to the first aspect of the invention (which may, for example, have any or all of the preferred features described with reference to the first aspect of the invention); and
(c) compressing means to compress the retention strip around a cable extending, in use, into the housing.

Preferably, the cable splice closure according to the second aspect of the invention further comprises at least one sealing member to form a seal between the housing and one or more cables extending into the housing in use, the or each sealing member having one or more cable entry apertures in which the, or at least one of the, retention strip(s) may be located in use when wound around a cable. Preferably, when the retention strip is contracted around a cable in a cable entry aperture through which the cable extends, the retention strip can grip, and thereby retain, the cable in the aperture. The or each sealing member preferably comprises a member to seal an end of the cable splice closure housing.

The compressing means may advantageously comprise one or more gripping members which can be moved relative to the remainder of the cable splice closure to compress the retention strip around a cable or the like extending, in use, into the closure, preferably thereby gripping the cable. Preferably such movement of the gripping member(s) is in a direction transverse, more preferably substantially perpendicular, to the direction in which a cable extends, in use, into the housing. The compressing means preferably comprises part of the, or at least one of the, sealing member (s) (where present). The compressing means can preferably be moved relative to a body portion of the sealing member of which it comprises part. The or each gripping member may, for example, take the form of a gripping part attached to a shaft, e.g. a threaded shaft so that the shaft may be screwed (further) into the sealing member for example, so as to push the gripping part of the gripping member against the retention strip. The or each gripping member is preferably operable by hand externally of the sealing member. For example, the sealing member may have a passageway communicating between a cable entry aperture in the sealing member and the outside of the sealing member and a shaft may extend between the gripping part of the gripping member through the passageway to the outside of the sealing member, where it can be operated by hand to make the required movement of the gripping member.

The sealing member preferably comprises two end plates between which is, at least in use, sealing material. More preferably, the or each gripping member is located in at least one of the end plates. The retention strip, when wound around a cable in a cable entry aperture of the sealing member through which the cable extends, can preferably close the aperture and thereby retain sealing material between the end plates. Preferably the sealing member is wrap-around (by which is meant that it may be positioned around a cable without having to slide onto an end of the cable), and more preferably it comprises two major parts which are separable in a plain in which, or substantially parallel to which, the cable(s) extend in use. Advantageously, the sealing member may, in use, have a cavity between the end plates thereof to contain the sealing material located therebetween. The cavity is preferably substantially closed in use.

The sealing material which may be used in the invention may comprise, for example, a grease, e.g. a silicone grease, or a gel or gelloid material. The preferred material comprises gel.

Advantageously, the sealing member may comprise means to compress the sealing material located between the end plates thereof. The sealing material compressing means may, for example, comprise a gripping member similar to those described above for compressing the sealing member. Such compression of the sealing material is particularly advantageous when the sealing material comprises gel.

The gel may, for example, comprise silicone gel, urea gel, urethane gel, thermoplastic gel, or any suitable gel or gelloid sealing material. Preferred gels comprise oil—extended polymer compositions. Preferably the gel has a hardness at room temperature as determined using a Stevens-Volland Texture Analyser of greater than 45 g, particularly greater than 50 g especially greater than 55 g, e.g. between 55 g and 60 g. It preferably has a stress-relaxation less than 12%, particularly less than 10% and especially less than 8%. Ultimate elongation, also at room temperature, is preferably greater than 60%, especially greater than 1000%, particularly greater than 1400%, as determined according to ASTM D638. Tensile modulus at 100% strain is preferably at least 1.8 MPa more preferably at least 2.2 MPa. In general compression set will be less than 35%, especially less than 25%. Preferably, the gel has a cone penetration as measured by ASTM D217 of at least 50 ($10^{-1}$ mm), more preferably at least 100 ($10^{-1}$ mm), even more preferably at least 200 ($10^{-1}$ mm) and preferably no greater than 400 ($10^{-1}$ mm), especially no greater than 350 ($10^{-1}$ mm).

The polymer composition of the gel may for example comprise an elastomer, or a block copolymer having relatively hard blocks and relatively elastomeric blocks. Examples of such copolymers include styrene-diene block copolymers, for example styrene-butadiene or styrene-isoprene diblock or triblock copolymers, or styrene-ethylene-butylene-styrene triblock copolymers as disclosed in international patent publication number WO88/00603. Preferably, however, the polymer composition comprises one or more styrene-ethylene-propylene-styrene block copolymers, for example as sold under the Trade Mark 'Septon' by Kuraray of Japan. The extender liquids employed in the gel preferably comprise oils conventionally used to extend elastomeric materials. The oils may be hydrocarbon oils, for example paraffinic or naphthenic oils, synthetic oils for example polybutene or polypropene oils, and mixtures thereof. The preferred oils are mixtures of non-aromatic paraffins and naphthenic hydrocarbon oils. The gel may contain additives such as moisture scavengers (e.g. Benzoyl chloride), antioxidants, pigments and fungicides.

According to a third aspect of the invention, there is provided a method of gripping an elongate object (e.g. a cable), comprising:

(a) winding around the elongate object a retention strip according to the first aspect of the invention (which may, for example, have any or all of the preferred features described with reference to the first aspect of the invention); and then (b) compressing the retention strip around the elongate object such that the retention strip contracts around, and grips, the elongate object.

BRIEF DESCRIPTION OF THE DRAWINGS

The invention will now be described, by way of example, with reference to the accompanying drawings, of which:

FIGS. 1 to 3 show three forms of retention strip according to the invention;

FIG. 6 shows two views of half of another form of sealing member according to the invention;

FIG. 7 shows another view of the sealing member half, shown in FIG. 5;

DETAILED DESCRIPTION OF THE INVENTION

Figure 1A:
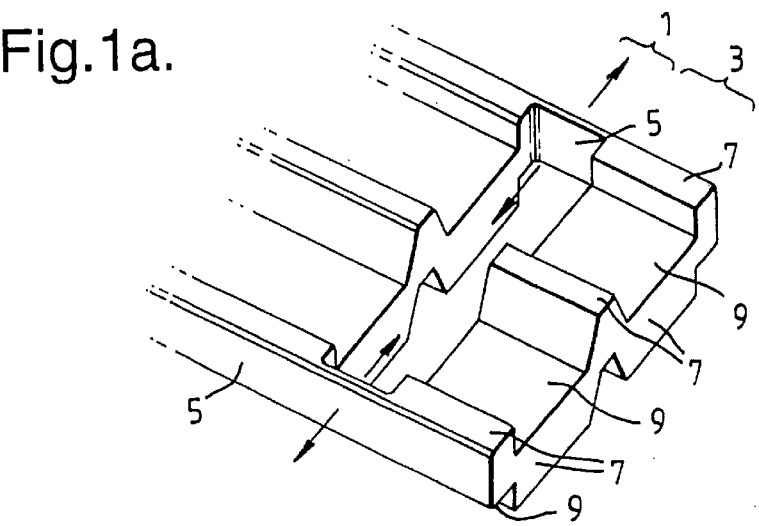
Figure 1B:
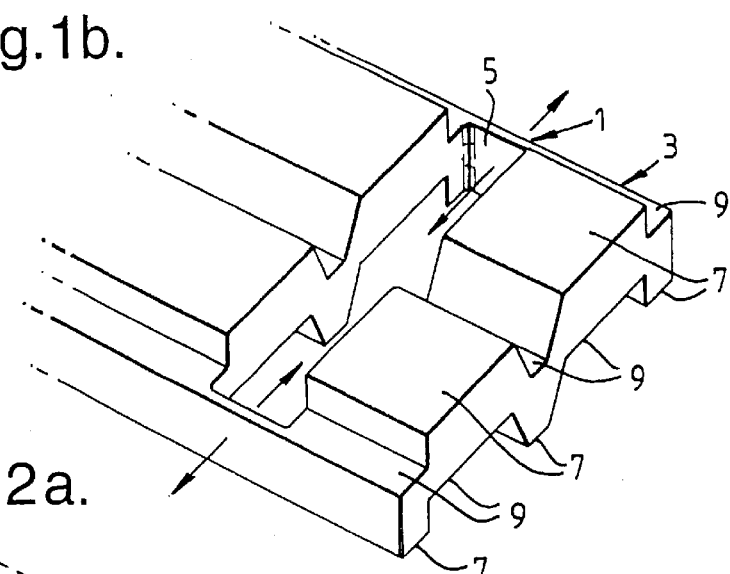

FIGS. 1, 2 and 3 each show a different design of retention strip according to the invention. FIGS. 1a and 1b show opposite sides of a first design of retention strip. The strip comprises a plurality of alternately collapsible and non-collapsible portions along at least part of its length: only one collapsible portion 1 and one non-collapsible portion 3 are shown in these figures. The collapsible portion 1 comprises two webs 5 extending between two non-collapsible portions at the edges of the strip. The webs 5 can deform, e.g. by buckling, concertinaing or by being crushed, preferably outwardly and/or inwardly with respect to the rest of the strip in the direction of the arrows. This deformation is therefore preferably in a direction generally or substantially parallel to the axial direction of extension of a cable etc. around which the strip is wound in use, such that substantially no gaps are formed between adjacent windings of the strip through which sealing material might be able to escape.

The strip of FIGS. 1a and 1b has protrusions 7 and recesses 9 which can engage corresponding recesses 9 and protrusions 7 of adjacent windings when, in use, the strip is wound around a cable etc. As mentioned above, this has the advantage of substantially preventing accidental axial displacement of the windings of the strip with respect to each other. Some of the protrusions may advantageously help the retention strip to grip a cable around which it is wound. Also, the protrusions and recesses of the strip may engage the gripping members of the sealing member, e.g. they may interlock with gripping protrusions on the gripping members.

Figure 2A:
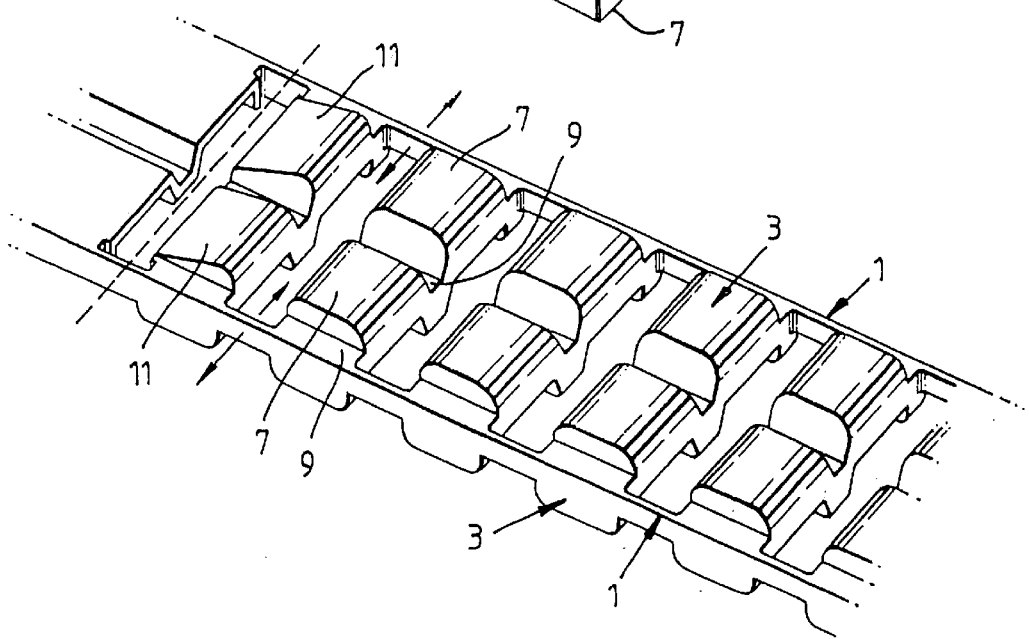

The retention strips shown in FIGS. 2 and 3 are similar to that shown in FIG. 1, except that the designs of the recesses and protrusions are different. FIGS. 2a and 2b show opposite sides of one design of strip, and FIGS. 3a and 3b show opposite sides of another design of strip. Each of these strips, however, has alternately collapsible portions 1 and non-collapsible portions 3. Both designs of strip illustrated in FIGS. 2 and 3 have a tapered non-collapsible portion 11 which is intended to be located at the end of the strip (the strip of FIG. 2 may be severed at the dotted line) to smooth either the inner or the outer end of the strip when wound. FIG. 3b shows a plurality of gripping protrusions 13 on one side of the strip for gripping a cable etc.

Figure 4:
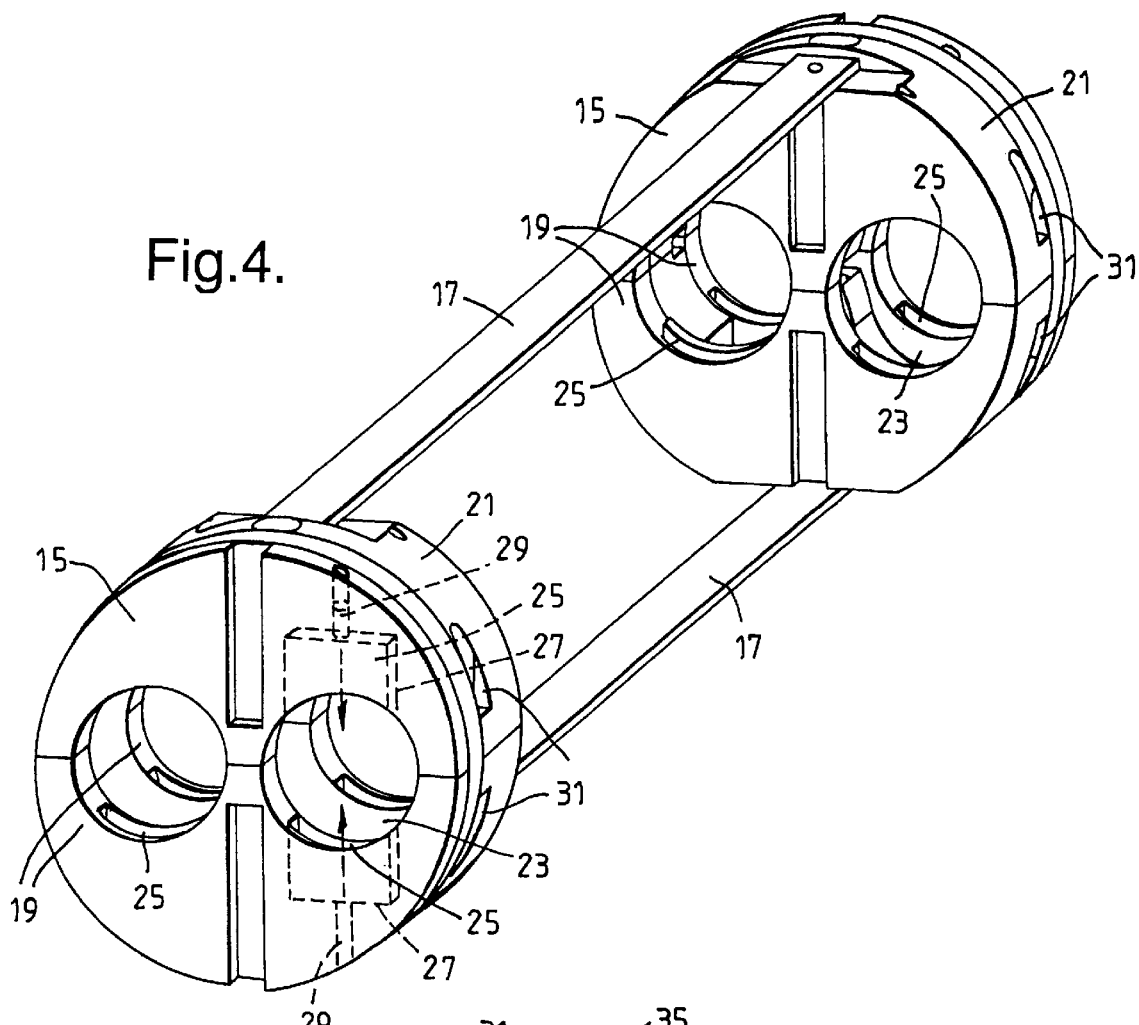
FIG. 4 shows two sealing members according to the invention arranged as for an in-line splice closure, i.e. spaced apart from each other and connected together by two elongate connecting members.

FIG. 4 shows two sealing members 15 according to the invention arranged for an in-line cable splice closure, i.e.

spaced apart from each other and arranged in line, but connected together by means of two elongate connecting members 17, in the form of bars, extending between them at their peripheries. Each sealing member 15 is hollow and comprises first and second spaced apart end plates 19 and a peripheral, i.e. circumferential, wall 21 extending between the end plates. The wall 21 substantially encloses the space between the end plates, thereby providing a cavity 23 in which, at least in use, sealing material, e.g. gel, (not shown), may be retained. Each sealing member 15 has two cable entry apertures extending through it.

Each sealing member 15, has channels 25 located in its first and second end plates 19, in each of which a gripping member (not shown) is located in use. The bottom left hand sealing member 15 as drawn shows two of these channels in dotted outline, and also shows arrows illustrating the direction in which the gripping members are moved in order to grip a cable, namely substantially perpendicular to the cable. Each channel 25 has a relatively wide part 27 to accommodate a gripping part of the gripping member and a relatively narrow part 29 to accommodate a threaded shaft of the gripping member. The narrow part 29 of the channel extends to the periphery of the sealing member so that the shaft may be screwed, from the exterior of the device, further into the sealing member so as to push the gripping part of the gripping member against a cable extending through the sealing member.

Figure 5:
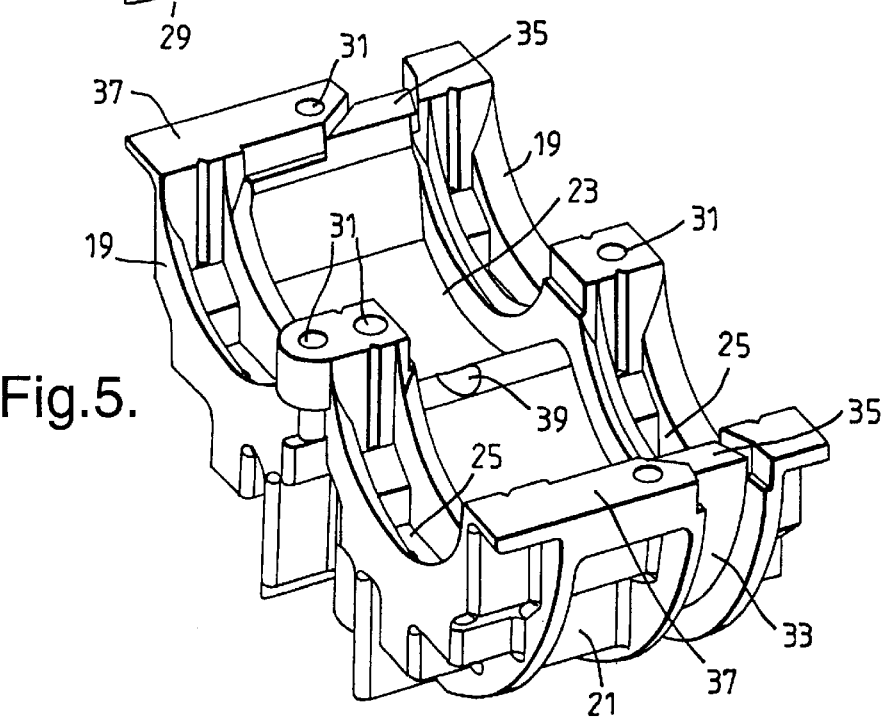
FIG. 5 shows half of a sealing member according to the invention.

Each sealing member 15 comprises two major parts (half pieces as shown) which are separable in a plane extending substantially coplanar with the cables which extend, in use, through the device. The half pieces are bolted together at points 31. FIGS. 5 to 7 show a variety of views of two different, but similar, sealing member half pieces: FIGS. 5 and 7 show two views of one form of sealing member and FIGS. 6a and 6b show two views of another, more preferred, form of sealing member. Each half piece is bolted to its mating half piece through holes 31. End plates 19, peripheral walls 21, cavities 23, and channels 25 (and narrow parts 29) are shown. The periphery of each half piece has a substantially semi-circular channel or groove 33 (which forms a substantially circular channel or groove in the assembled sealing member) for an O-ring seal. The O-ring (which may for example be formed from an elastomeric material, especially rubber) forms a seal between the sealing member and the housing of the splice closure. Each of the half pieces have windows (i.e. gaps) 35 communicating between the cavity 23 and the channel 33, through which, in use, extends sealing material from the cavity. These windows generally have a dual function: firstly they enable the sealing material to form a seal which substantially blocks longitudinal passage of fluid (e.g. moisture or gas) between mating faces 37 of each half piece; secondly they enable the sealing material to contact the sealing O-ring, thereby forming a good seal at each so-called triple point, i.e. where the longitudinal seal for the sealing member (provided by the sealing material in the window) meets the circumferential seal for the sealing member (provided by the O-ring).

The sealing member half pieces of FIGS. 5 to 7 are shown without their respective pressure members which, in use, are moved towards the cables to urge the sealing material (also not shown) against the cables. However, passageways 39 communicating between the cavity of each device and the exterior of the device are shown. Each passageway accommodates, in use, a threaded shaft connected to the pressure member for screwing the pressure member towards the cables.

The cavity of the sealing member of FIG. 6b has a region 41 of alternating ridges and grooves adjacent to one of its end plates. These ridges and grooves increase the path length along which any moisture ingressed between the body portion of the sealing member and the sealing material would have to travel in order to pass through the sealing member and into the splice closure. They therefore provide an extra barrier against ingress of moisture.

Figure 8:
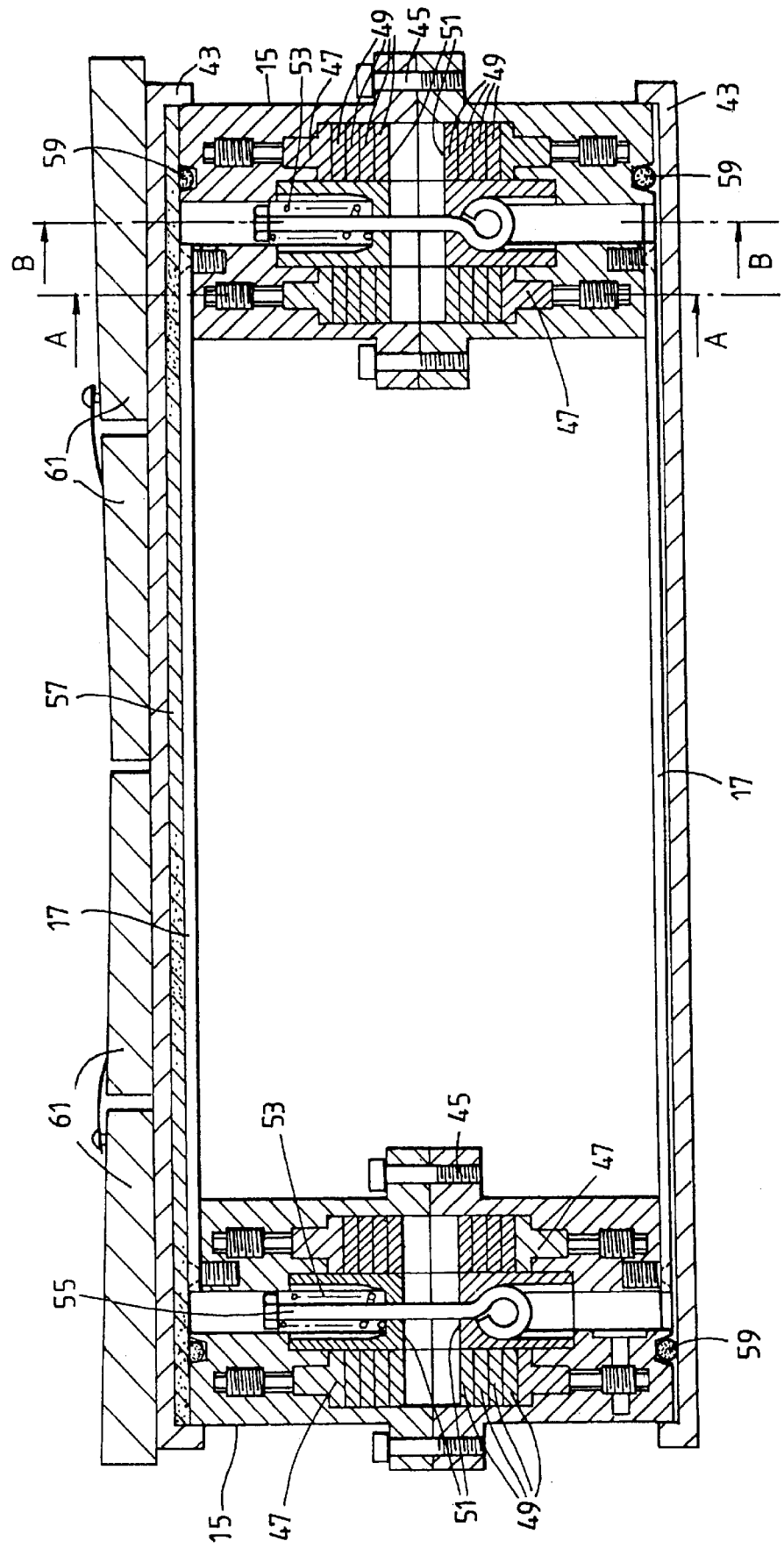
FIG. 8 shows, in cross-section, an assembled cable splice closure according to the invention.

FIG. 8 shows, in cross-section, an assembled in-line cable splice closure according to the invention. The closure comprises two sealing members 15, each located at an end of a substantially cylindrical housing 43. Connecting bars 17 extend between and interconnect the two sealing members. In this embodiment, each sealing member has bolts 45 which join the two half pieces of each sealing member together. Pairs of gripping members 47 are located in the end plates of each sealing member, and wound spirally between the gripping members of each pair, in a cable entry aperture, is a retention strip 49 (described in detail with reference to FIGS. 1 to 3 above). Each sealing member also has a pressure member 51 located in its central cavity. Each pressure member has a resilient member in the form of a helical spring 53 mounted on a shaft 55 thereof, to bias the pressure member against the sealing material.

The housing 43 is wraparound and has a longitudinally extending opening provided with a longitudinal seal 57, which contacts O-rings 59 located around the sealing members. The housing 43 is preferably closed by means of closing members 61 which have wedge-shaped channels which are slid onto wedge-shaped rails (not shown) on the outside of the housing. Any other suitable way of closing the housing could, of course, be used.

Figure 9:
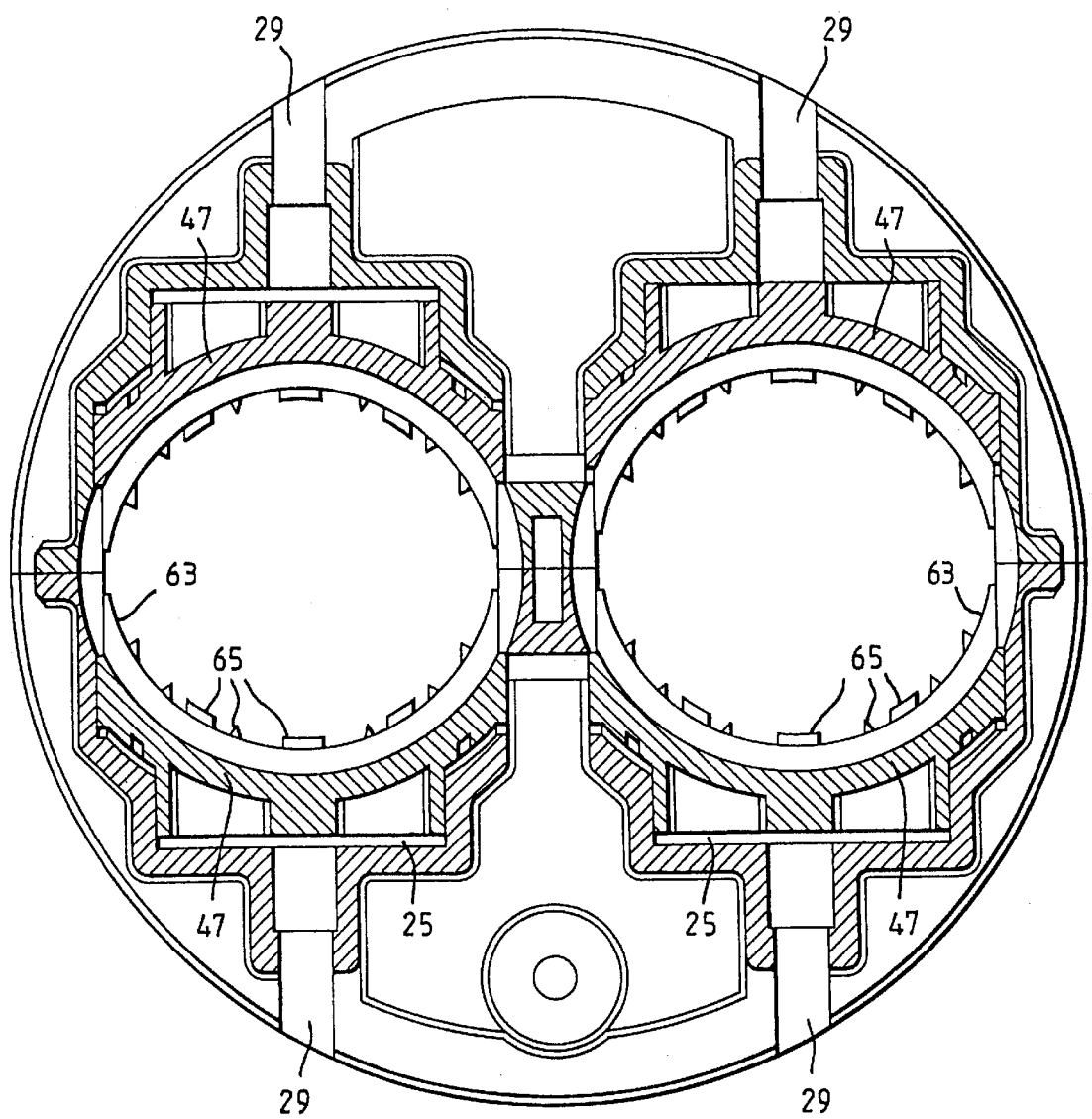
FIG. 9 shows one of the sealing members of the closure shown in FIG. 8 in cross-section A—A.

FIG. 9 shows one of the sealing members of the splice closure shown in FIG. 8, in cross-section A—A. This cross-section illustrates the gripping members 47 of the sealing member, movably located in channels 25. Each gripping member 47 has an arcuate gripping surface 63 provided with gripping protrusions 65.

Figure 10:
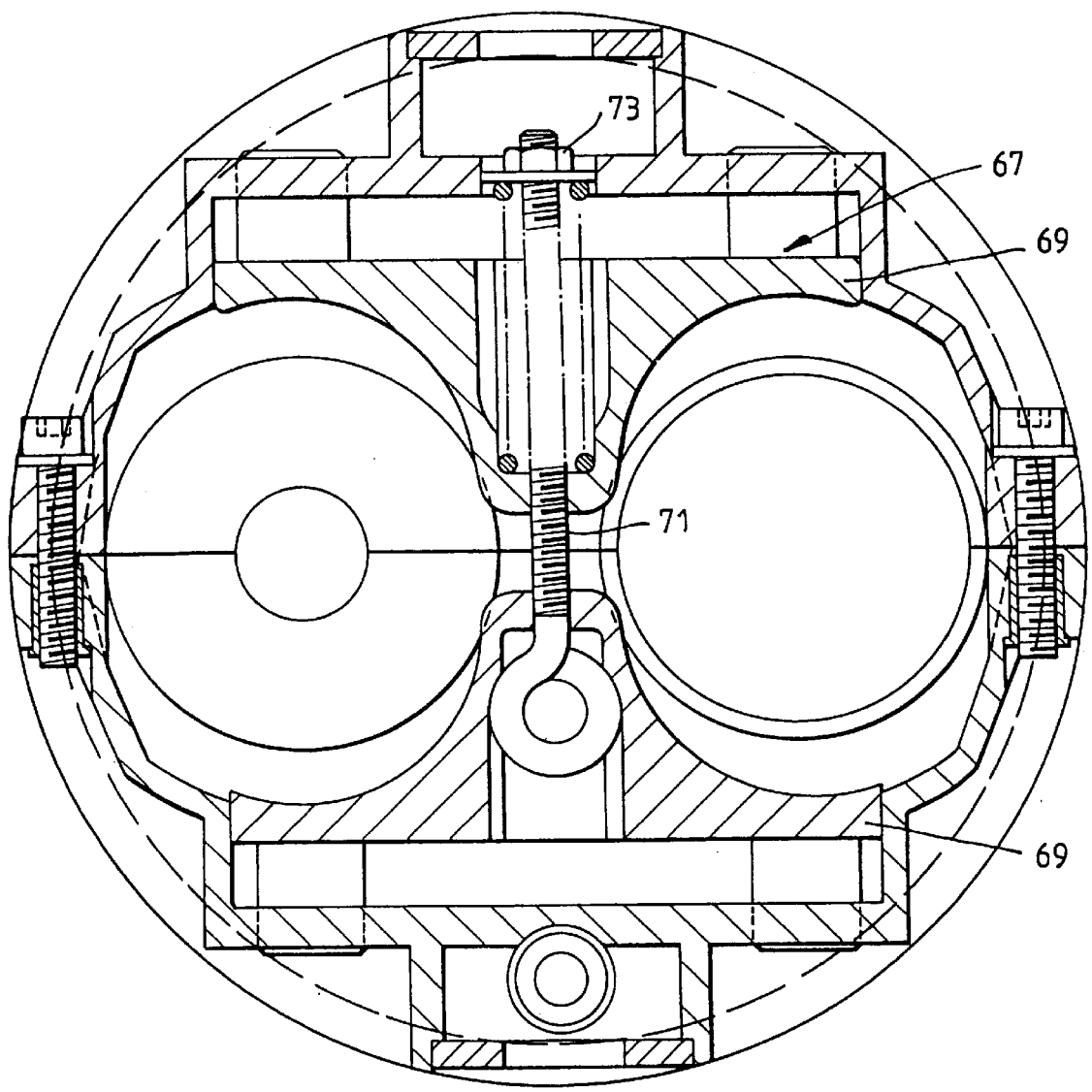
FIG. 10 shows the sealing member of FIG. 6 in cross-section B—B.

FIG. 10 shows the sealing member of FIG. 9 in cross-section B—B. This cross-section illustrates the pressure member 67 comprising two pressure parts 69 mounted on a shaft 71 extending between the two sealing member half pieces. Tightening the nut 73 on the shaft 71 forces the two pressure parts 69 towards each other and consequently, in use, towards the cables extending into the closure. The shaft 71 has a helical spring 75 located on it, to bias the pressure parts 69 towards each other.

We claim:

1. A cable splice closure, comprising:
   (a) a housing;
   (b) a retention strip for winding around an elongate object, which, when wound in use and then compressed around the object, will decrease in length thereby allowing contraction of the strip around the object, wherein said retention strip comprises a collapsible portion and can decrease in length due to the collapsing of the collapsible portion; and
   (c) compressing means to compress the retention strip around a cable extending, in use, into the housing.

2. A cable splice closure according to claim 1, further comprising a sealing member to form a seal between the housing and the cable extending into the housing in use, the sealing member having a cable entry aperture in which the retention strip may be located when wound around the cable.

3. A cable splice closure according to claim 2, in which the compressing means is part of the sealing member.

4. A cable splice closure according to claim 2, in which the sealing member comprises two end plates, said sealing member having sealing material located between said two end plates.

5. A cable splice closure according to claim 4, in which the compressing means compresses a gripping member which can be moved relative to a part of the cable splice closure other than the gripping member to compress the retention strip around the cable extending, in use, into the closure, and wherein the gripping member is located in at least one of the end plates.

6. A cable splice closure according to claim 4, in which the sealing material comprises gel.

7. A cable splice closure according to claim 1, in which the compressing means compresses a gripping member which can be moved relative to a part of the cable splice closure other than the gripping member to compress the retention strip around the cable extending, in use, into the closure.

8. A cable splice closure according to claim 7, in which movement of the gripping member is in a direction substantially perpendicular to a direction in which the cable extends, in use, into the housing.

9. A retention strip for winding around an elongate object which, when wound in use and then compressed around the object, will decrease in length thereby allowing contraction of the strip around the object, wherein said retention strip comprises a collapsible portion and can decrease in length due to collapsing of the collapsible portion.

10. A retention strip according to claim 1, which when contracted around the elongate object said retention strip can grip the object.

11. A retention strip according to claim 10, which has a plurality of protrusions on a surface thereof, to enhance grip of the retention strip on the elongate object around which the retention strip is wound in use.

12. A retention strip according to claim 9, which when contracted around the elongate object, said retention strip can substantially prevent passage of sealing material therethrough along the object, thereby retaining the sealing material on one side thereof.

13. A retention strip according to claim 9, in which the elongate object comprises a cable.

14. A retention strip according to claim 9, in which the collapsible portion can collapse by deforming.

15. A retention strip according to claim 14, in which deformation of said strip occurs in a direction substantially parallel to direction of extension of the elongate object around which the strip is wound, in use.

16. A retention strip according to claim 14, in which the collapsible portion comprises a web extending between substantially non-collapsible portions.

17. A retention strip according to claim 16, which comprises a plurality of alternately collapsible and substantially non-collapsible portions along at least part of length thereof.

18. A retention strip according to claim 9, in which the collapsible portion provides the flexibility to enable the retention strip to be wound around the elongate object.

19. A retention strip according to claim 9, which is profiled such that, when wound around the elongate object, successive windings interlock with each other, thereby substantially preventing displacement of the windings with respect to each other along the object.

20. A method of gripping an elongate object, comprising:

(a) winding around the elongate object a retention strip, the retention strip for winding around the elongate object, and which, when wound in use and when then compressed around the object, will decrease in length thereby allowing contraction of the strip around the object, wherein said retention strip comprises a collapsible portion and can decrease in length due to the collapsing of the collapsible portion; and (b) compressing the retention strip around the elongate object such that the retention strip contracts around, and grips, the elongate object.

* * * * *